Patented June 21, 1932

1,864,058

UNITED STATES PATENT OFFICE

HANS FRANZEN AND MARTIN LUTHER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF ORGANIC ACIDS

No Drawing. Application filed July 8, 1929, Serial No. 376,841, and in Germany August 8, 1928.

The present invention relates to the recovery of organic acids from the oxidation products of high molecular organic compounds.

In the recovery of organic acids from the oxidation products of paraffin hydrocarbons, waxes and the like it is very difficult to obtain the acids free from unsaponifiable materials when working on an industrial scale. We have found that a complete saponification of the oxidation products of high molecular organic compounds, such as paraffin hydrocarbons, waxes and the like, and an almost complete separation of the unsaponifiable materials are effected by carrying out the saponification of the acid oxidation products with a hydroxide of an alkaline earth metal, which term is meant to include magnesia in aqueous suspension, if desired with the employment of pressure, separating the salts obtained from any aqueous layer containing impurities that may be present, thoroughly drying the saponified mixture and, after suitable comminution, subjecting it to extraction with a suitable organic solvent such as benzine. The quantity employed of the saponifying agent may correspond to that theoretically required but in most cases a slightly higher quantity is advisable. After the extraction the salts, from which the residual solvent can be removed by warming, are decomposed by acids, such as sulphuric acid, carbonic acid and the like, if desired with the addition of wetting agents and with the employment of pressure, and in this manner the acid constituents contained in the oxidation product are obtained in a quantitative yield and practically free from unsaponifiable materials.

The following example will further illustrate the nature of the invention but the invention is not restricted thereto. The parts are by weight.

Example 100 parts of an oxidation product of paraffin wax containing 36 per cent of unsaponifiable materials are vigorously stirred with an aqueous suspension containing an excess of 8 per cent above the quantity of slaked lime theoretically required, for 2 hours at 160° centigrade in an autoclave at a pressure of 5 atmospheres. After drawing off the dark colored aqueous layer the calcium salt obtained is thoroughly dried on a drying roller and treated at 40° centigrade with benzine of a boiling point from 60° to 100° centigrade. The extracted calcium salt is freed from the last traces of solvent by warming and is decomposed with mineral acid. The yield of acid constituents is quantitative and the content of unsaponifiable material amounts to about 1 to 2 per cent only of the final product. The mixture of acids obtained consists mainly of aliphatic carboxylic acids corresponding to the formula $C_nH_{2n}O_2$.

What we claim is:—

1. The process for the recovery of organic acids from acid oxidation products of high molecular organic compounds which comprises saponifying the oxidation product with an aqueous suspension of an alkaline earth metal hydroxide in excess quantity of that required for saponification, separating any aqueous layer formed, drying the product obtained and subjecting it to extraction with benzine.

2. The process for the recovery of organic acids from acid oxidation products of high molecular organic compounds which comprises saponifying the oxidation product with an aqueous suspension of a quantity of slaked lime in excess of that required for saponification, separating any aqueous layer formed, drying the product obtained and subjecting it to extraction with benzine.

3. The process for the recovery of organic acids from acid oxidation products of high molecular organic compounds which comprises saponifying the oxidation product with an aqueous suspension of a quantity of slaked lime in excess of that required for saponification, separating any aqueous layer formed, drying the product obtained and subjecting it to extraction with benzine of a boiling point from 60° to 100° C.

In testimony whereof we have hereunto set our hands.

HANS FRANZEN.
MARTIN LUTHER.